(12) United States Patent
Probst

(10) Patent No.: US 12,459,168 B2
(45) Date of Patent: Nov. 4, 2025

(54) CASTING IN THE FORM OF A SINK

(71) Applicant: Schock GmbH, Regen (DE)

(72) Inventor: Alois Probst, Regen (DE)

(73) Assignee: SCHOCK GMBH, Regen (DE)

( * ) Notice: Subject to any disclaimer, the term of this patent is extended or adjusted under 35 U.S.C. 154(b) by 49 days.

(21) Appl. No.: 17/370,015

(22) Filed: Jul. 8, 2021

(65) Prior Publication Data
US 2022/0024082 A1 Jan. 27, 2022

(30) Foreign Application Priority Data

Jul. 22, 2020 (DE) ...................... 10 2020 119 385.8

(51) Int. Cl.
B29C 64/00 (2017.01)
B29C 39/00 (2006.01)
B29C 39/02 (2006.01)
C08F 20/14 (2006.01)
C08K 3/013 (2018.01)
C08K 5/00 (2006.01)
C08K 5/11 (2006.01)
B29K 33/00 (2006.01)
(Continued)

(52) U.S. Cl.
CPC .......... *B29C 39/006* (2013.01); *B29C 39/026* (2013.01); *C08F 20/14* (2013.01); *C08K 3/013* (2018.01); *C08K 5/0025* (2013.01); *C08K 5/11* (2013.01); *B29K 2033/12* (2013.01); *B29K 2105/0002* (2013.01); *B29K 2105/24* (2013.01); *B29K 2995/0056* (2013.01); *B29K 2995/0094* (2013.01); *B29L 2031/7698* (2013.01)

(58) Field of Classification Search
CPC ............................. B29C 39/006; C08K 3/013
See application file for complete search history.

(56) References Cited

U.S. PATENT DOCUMENTS 5,218,013 A 6/1993 Schock
D353,652 S 12/1994 Dannenberg
(Continued)

FOREIGN PATENT DOCUMENTS

CN 103502542 A 1/2014
DE 3832351 A1 4/1990
(Continued)

OTHER PUBLICATIONS https://3space.com/injection-molding-draft-angle/ (Year: 19).*
(Continued)

*Primary Examiner* — Nicholas Krasnow
(74) *Attorney, Agent, or Firm* — LUCAS & MERCANTI, LLP; Klaus P. Stoffel

(57) ABSTRACT

A casting in the form of a sink, including a basin having a base, a rear wall, a front wall and two interconnecting side walls, and also a circumferential rim that extends to the side of the basin and consists of flat rim sections that extend in a straight line from the lateral edges of the rear wall, the side walls and the front wall. The sink is composed of a composite material including a cured polymeric binder and filler particles intercalated therein. A skirt that surpasses the height of the front wall at least in sections adjoins at least the rim section of the front wall, and its outer face extends at right angles from the outer face of the rim section and in a straight line up to the end thereof.

27 Claims, 3 Drawing Sheets

(51) Int. Cl.
  *B29K 105/00* (2006.01)
  *B29K 105/24* (2006.01)
  *B29L 31/00* (2006.01)

(56) References Cited

U.S. PATENT DOCUMENTS

| | | | |
|---|---|---|---|
| 8,853,300 B2 | 10/2014 | Reichenberger | |
| 9,173,487 B2 | 11/2015 | Booth | |
| D926,947 S * | 8/2021 | Ling | D23/284 |
| D930,798 S * | 9/2021 | Liang | D23/284 |
| 2008/0132607 A1* | 6/2008 | Reichenberger | C08J 5/10 |
| | | | 524/556 |
| 2012/0222211 A1* | 9/2012 | Booth | E03C 1/18 |
| | | | 4/619 |
| 2014/0295119 A1* | 10/2014 | Clarke | B29C 49/02 |
| | | | 264/318 |
| 2018/0187400 A1 | 7/2018 | Chong | |
| 2018/0187401 A1* | 7/2018 | Chong | A47K 1/04 |
| 2021/0087383 A1 | 3/2021 | Datsyuk | |

FOREIGN PATENT DOCUMENTS

| | | | |
|---|---|---|---|
| DE | 102004055365 A1 | 5/2006 | |
| DE | 102019205279 A1 | 10/2020 | |
| DE | 102019125777 A1 | 3/2021 | |
| EP | 2681367 B1 | 1/2014 | |
| EP | 3431245 A1 | 1/2019 | |
| IT | 201600108376 A1 | 4/2018 | |
| WO | 2012121976 A1 | 9/2012 | |

OTHER PUBLICATIONS

Jong, W.R., Li, T.C., Chen, Y.W. and Ting, Y.H., 2017. Automatic recognition and construction of draft angle for injection mold design. Journal of Software Engineering and Applications, 10(01), p. 78. (Year: 2017).*

German Office Action Dated May 7, 2021, DE 10 2020 119 385.8, 7 Pages.

Blanco Crones xl 8 ein Spülstein aus Edelstahl, Frederik Dix, Jul. 15, 2017, https://www.kuechen-design-magazin.de/blanco-cronos-xl-8-ein-spuelstein-ausedelstahl.

Blanco Crones xl 8 ein Spülstein aus Edelstahl, Frederik Dix, Jul. 15, 2017, Frontschürze.

Indian Patent Office issued an Examination Report on Mar. 7, 2022 regarding parallel Indian Patent Application No. 202144031543, 6 Pages.

European Patent Office issued an European Search Report on May 25, 2022 regarding parallel European Patent Application No. 21180862. 1, 14 pages.

European Patent Office issued Search Report on Jan. 7, 2022 regarding parallel European Patent Application No. 21 180 862.1, 13 Pages.

Chinese Patent Office issued an Office Action on Nov. 23, 2023 regarding parallel Chinese Patent Application No. 202110829675.7, 7 pages.

Canadian Intellectual Property Office issued an Office Action on Apr. 14, 2022 regarding parallel Canadian Patent Application No. 3125029, 5 Pages.

Chinese Patent Office issued an Office Action on Aug. 9, 2024 regarding parallel Chinese Patent Application No. 202110829675.7, 4 pages.

Structural Design and Manufacturing Process for Mobile Phones (Ren Wenjia, pp. 15-16, South China University of Technology Press, Nov. 2005).

Industrial Design Graphics (Bai Miao, p. 167, Shenyang: Liaoning Arts Publishing House, May 2020).

* cited by examiner

CASTING IN THE FORM OF A SINK

CROSS-REFERENCE TO RELATED APPLICATIONS

The present application claims priority of DE 10 2020 119 385.8, filed Jul. 22, 2020, the priority of this application is hereby claimed, and this application is incorporated herein by reference.

BACKGROUND OF THE INVENTION

The invention relates to a casting in the form of a sink comprising a basin having a base, a rear wall, a front wall and two interconnecting side walls, and also a circumferential rim that extends to the side of the basin and consists of flat rim sections that extend in a straight line from lateral edges of the rear wall, the side walls and the front wall, wherein the sink consists of a composite material comprising a cured polymeric binder and filler particles intercalated therein.

Such cast sinks consisting of a composite material are enjoying increasing popularity. Since they consist of a composite material comprising a cured polymeric binder and filler particles intercalated therein, they firstly have excellent mechanical properties, and there is secondly a wide range with regard to color and surface structuring, since the basis for such a sink is a polymer-based casting compound with introduced filler particles.

Such a sink comprises, in a known manner, a basin having a base, a rear wall, a front wall and two side walls. Also provided is a circumferential rim that extends away from the lateral edges of the rear wall, the front wall and the side walls. This lateral rim serves as rest in the assembly of the sink, wherein the sink is placed by its rim from above onto a cabinet beneath, which is machined beforehand to a depth of about 8 mm in the region of the rest surface. A worktop is subsequently placed on top of the lower cabinet and the rim of the sink.

SUMMARY OF THE INVENTION

The problem addressed by the invention is that of specifying a casting in the form of a sink that has been improved by comparison.

The problem is solved in accordance with the invention in the casting in the form of a sink of the type specified at the outset in that a skirt that surpasses the height of the front wall at least in sections adjoins at least the rim section of the front wall, and its outer face extends at right angles from the outer face of the rim section and in a straight line up to the end thereof.

The casting or sink of the invention is notable for a skirt shaped subsequently onto the front wall rim in an integral manner, which runs from the rim downward, surpassing or covering the height of the front wall at least in sections. The outer face of the skirt which is visible in the installation view runs at right angles to the visible outer face of the rim section on the front wall side, meaning that, when it runs horizontally in the installation view, the outer face of the skirt accordingly runs vertically. In the installation view, the skirt accordingly forms the visible conclusion at the front of the sink, and ultimately clads the mounted sink in its arrangement, for example, on the worktop or especially an appropriate platform cabinet or the like. In the installation view, accordingly, the sink with the rim sections that adjoin the side walls lies atop corresponding top edges of the side walls of the platform cabinet, while the worktop lies flat on the rim sections that adjoin the rear wall and the two side walls. The rim on the rear wall is secured to the worktop by platform clamps, which is entirely sufficient for extremely stable and fixed installation. The rim section that adjoins the front wall ultimately extends as far as the front edge of the worktop or of the platform cabinet, or possibly even somewhat further, where the rim section then merges into the skirt running vertically downward, which forms the panel visible at the front and forms, for example, a facing down to a door or the like provided beneath in the platform cabinet. This means that the sink of the invention offers a distinct improvement in installability, since it can be placed closer to the front edge of the worktop or of the platform cabinet, or the basin can be moved further forward, since the rim section at the front edge need not be underpinned by a corresponding support section on the worktop side or platform cabinet side. At the same time, the skirt integrated into the shape forms a very attractive visible panel or facing that enables visually attractive integration of the sink. A particular contribution to this is made by the fact that the outer face of the skirt runs at right angles to the outer face of the rim section, resulting in corresponding surfaces on the part of the sink that run parallel to adjacent surfaces on the part of the platform cabinet or the worktop. Visually very effective integration and an attractive design are also enabled by the fact that the sink consists of a composite material comprising a polymer matrix and embedded fillers, which offers a wide range of variation especially with regard to color by the filler particles, and also the surface structure, and since the outer face of the skirt is visible in the installed position.

Another installation variant is also conceivable. The sink here is placed onto a lower undercabinet and the worktops end on short lateral wall sections that are provided in this case, which adjoin the lateral rim sections and merge into the skirt at the front. The worktop is then placed flush onto these short wall sections. Here too, the skirt clads the transition to the platform cabinet.

It is particularly appropriate when the skirt consists of a middle skirt section that extends along the front wall and two skirt sections that merge into the rim sections of the side walls in a rounded manner, adjoin the lateral edges thereof and are at right angles to these rim sections. In this development, the skirt is provided not just running along the lateral edge of the front wall, but also extends with short skirt sections around the corner of the sink or of the basin rim, and binds to the lateral edges of the rim sections of the side walls. The transition is rounded, resulting in a radius in the corner region on the outer face of the skirt in the range, for example, between 0.5-2 cm. The outer faces of these rounded skirt sections also again run at right angles to the outer faces of the upper rim sections, ultimately resulting in this vertical geometry throughout the skirt region. The skirt sections that extend around the corner, when the rim section on the front wall side extends somewhat beyond the front edge of the platform cabinet or the worktop, enable closure of any gap that arises between the skirt and the platform cabinet, i.e. coverage by means of the skirt sections, such that the skirt accordingly constitutes a facing not just to the front but also to the side. Moreover, the vertical lateral edges of the skirt sections abut the vertical faces of the platform cabinet in particular and brace the skirt against the platform cabinet.

The horizontal length of the lateral skirt sections here is appropriately such that they end before the front wall. This means that, viewed in a side view of the sink, they do not extend up to the front wall, i.e. are spaced apart in the installed position from the edges of the skirt sections, which, as described, adjoin corresponding vertical edges of a platform cabinet or the like. Alternatively, the skirt sections may also extend up to the front wall if the gap to the platform cabinet that has to be bridged is correspondingly large.

In an advantageous development of the invention, the skirt, at least in sections, narrows in thickness towards its end. This means that the skirt, no matter whether the skirt runs solely along the edge of the rim section on the front wall side or extends around the corner by the skirt sections, does not have a uniform thickness from the upper to the lower end, but becomes narrower, i.e. thinner, from the top downward. While, as described, the outer face of the skirt runs at right angles to the outer face of the rim section, and accordingly runs vertically in the installed position, the inner face of the skirt, which is invisible in the installed position, runs at an appropriately small angle to the vertical, i.e. therefore not parallel to the outside of the skirt or outer face. The skirt preferably narrows in thickness over its entire height, meaning that the entire inside face runs at an angle to the outside face of the skirt, i.e. does not run parallel.

This configuration is advantageous especially in relation to the demoldability of the cast sinks from the casting mold, in that, owing to the angle that then exists between the outside of the skirt and the inside of the skirt, it is possible without difficulty to remove the corresponding mold elements that define the skirt cavity between the skirt and the front wall.

It is conceivable here that the middle skirt section, i.e. the section that runs along the front wall side of the rim section, narrows more significantly than the two lateral skirt sections. This means that the two lateral skirt sections need not necessarily narrow at the same angle as the middle skirt section. Since the two lateral skirt sections are only very short when viewed horizontally, demoldability in this region is less problematic than in the long middle skirt region that extends over the entire length of the sink. An additional alternative is that all skirt sections narrow in an equivalent manner.

In principle, the thickness of the skirt should narrow constantly at an angle between 0.1-1.5°. This angle relates to the skirt itself and indicates how the inner face of the skirt runs relative to the outer face of the skirt. These are not parallel to one another, but at an angle between 0.1-1.5°.

If both a middle skirt region and two lateral skirt sections are provided, the middle skirt section should narrow at an angle between 0.5°-1.5°, preferably between 0.7°-1.3°, and especially at an angle of 1.0°. The lateral skirt sections should appropriately narrow at an angle between 0.1°-1.0°, preferably between 0.2°-0.5°, and especially at an angle of 0.2°. Although angles that are quite obviously only very small are given, these are already sufficient for good demolding.

As described, the sink of the invention is a casting or molding produced from a casting compound. It thus consists of a composite material. The casting compound and hence the cured composite material itself consist of a cured polymeric binder, and fillers intercalated therein. This binder used is preferably a monomer and a polymer dissolved therein. More particularly, a suitable monomer is a methyl methacrylate, and a suitable polymer a polymethylmethacrylate, in which case it is optionally additionally possible to provide a crosslinker, especially trimethylolpropane trimethacrylate. Examples of usable casting compounds, or of those composite materials from which a sink of the invention can be produced, are disclosed, for example, in DE 38 32 351 A1 or DE 10 2004 055 365 A1. These both describe appropriate examples of the binder consisting of a mixture of a monomer and a polymer and optionally a crosslinker, and specify examples of different filler particles usable, especially inorganic filler particles, including in the form of mineral, coated and/or uncoated filler particles or mixtures thereof. Reference is made explicitly to DE 38 32 351 A1 and DE 20 2004 055 365 A1, and the disclosure content thereof, especially with regard to the casting compounds disclosed therein that are usable for production of the sink of the invention and the composite materials produced therefrom, is explicitly incorporated into the disclosure of the present application.

An appropriate variant of the invention envisages, with regard to the casting compound used and hence the composition of the composite material, that it is a heat-curable biobased casting compound or a heat-cured composite material, comprising:

(a) one or more mono- and one or more polyfunctional acrylic and methacrylic biomonomers of vegetable or animal origin,
(b) one or more polymers or copolymers selected from polyacrylates, polymethacrylates, polyols, polyesters made from recycled material or of vegetable or animal origin,
(c) inorganic filler particles of natural origin,
wherein the proportion of the mono- and polyfunctional acrylic and methacrylic biomonomer(s) is 10-40% by weight, the proportion of the polymer(s) or copolymer(s) is 1-16% by weight and the proportion of inorganic filler particles is 44-89% by weight.

It is a feature of the casting compound of the invention that the majority, if not 100%, consists of biological or natural materials, especially with regard to the crosslinking substances used. For instance, in accordance with the invention, the mono- and polyfunctional acrylic and methacrylic biomonomers used are exclusively of vegetable or animal origin. There is thus no use here of any polymers obtained by petrochemical means. A biomonomer is a monomer of a biopolymer. The term "polyfunctional" includes bifunctional, trifunctional and higher-functionality biomonomers.

The polymers or copolymers used are preferably likewise of purely vegetable or animal origin, meaning that these substances are not of petrochemical origin either. Here, however, as an alternative to the use of substances of vegetable/animal origin, it is also possible to use polymers or copolymers from recycled material. Although this material is usually of petrochemical origin, no new material is used, but rather an existing but recycled material is reused, which is likewise advantageous from an environmental point of view. Since the biomonomers, as well as the inorganic fillers used that are likewise of natural origin, make up the major proportion on the polymer side, a majority of petrochemical-based substances used to date is replaced by biomaterial in the form of biomonomers within the casting compound of the invention itself even when recycled material is used. Preference is of course also given to using polymers or copolymers of purely vegetable or animal origin, such that the result in this case is a casting compound consisting of 100% natural materials, since, as described, the fillers are also of purely natural origin. This means that the molding produced from the casting compound of the invention is consequently a bio-molding consisting predominantly or preferably entirely of biological, i.e. natural, materials. The production of the biocomposites from the filler particles and the crosslinking materials that are produced from renewable sources reduces the consumption of materials from petrochemical production and hence mineral oil consumption and has a positive effect on the environment.

In spite of use of predominantly or exclusively natural materials for production of the casting compound or the molding, i.e. a kitchen sink, it has been found that the molding exhibits very good, and in some cases even better, mechanical properties, especially with regard to impact resistance or scratch resistance, compared to a known casting compound produced from crosslinking materials obtained by petrochemical means or such a molding.

The production of the biocomposite molding in the form of the kitchen sink from high-grade mono- and polyfunctional bioacrylate and biomethacrylate monomers enables combination of high technical performance demands and an elevated biorenewable carbon content (BRC) (proportion of renewable carbon or biobased carbon content) in products. There is a multitude of different bioavailable sources for production of mono- and polyfunctional bioacrylate and biomethacrylate monomers, for example vegetable oil, animal fat, wood. A BRC in biomonomers of up to 90% may be achieved. Since the casting compound is effectively a bio-casting compound, since it even preferably consists of 100% natural biological substances, the kitchen sink is a biocomposite kitchen sink.

The molding made from the bio-composite material consists of the mixture of the inorganic filler embedded into the polymer matrix via a process of crosslinking polymerization of the mono- and polyfunctional biomonomers and achieves its high sustainability effect through the use of the renewable raw materials.

One example of such a bio-casting compound and such a bio-composite material is specified in the applicant's subsequently published German patent application DE 10 2019 125 777.8, the disclosure content of which is explicitly incorporated into the disclosure of the present application.

According to the invention, the weight ratio of monofunctional biomonomers to polyfunctional biomonomers should be 2:1 to 80:1, preferably 4:1 to 70:1, especially 5:1 to 60:1.

It is possible to use a monofunctional biomonomer in the form of a biobased acrylate. This may be selected from n-butyl acrylate, methyl acrylate, ethyl acrylate, tert-butyl acrylate, isobutyl acrylate, isodecyl acrylate, dihydrodicyclopentadienyl acrylate, ethyldiglycol acrylate, heptadecyl acrylate, 4-hydroxybutyl acrylate, 2-hydroxyethyl acrylate, hydroxyethylcaprolactone acrylate, polycaprolactone acrylate, hydroxypropyl acrylate, lauryl acrylate, stearyl acrylate, tertiobutyl acrylate, 2-(2-ethoxy)ethyl acrylate, tetrahydrofurfuryl acrylate, 2-phenoxyethyl acrylate, ethoxylated 4-phenyl acrylate, trimethylcyclohexyl acrylate, octyldecyl acrylate, tridecyl acrylate, ethoxylated 4-nonylphenol acrylate, isobornyl acrylate, cyclic trimethylolpropane formal acrylate, ethoxylated 4-lauryl acrylate, polyester acrylate, stearyl acrylate, hyperbranched polyester acrylate, melamine acrylate, silicone acrylate, epoxy acrylate.

It is additionally possible to use a monofunctional biomonomer in the form of a biobased methacrylate. This may be selected from methyl methacrylate, ethyl methacrylate, n-butyl methacrylate, isobutyl methacrylate, tert-butyl methacrylate, behenyl methacrylate, ehenylpolyethylene glycolmethacrylate, cyclohexyl methacrylate, isodecyl methacrylate, 2-ethylhexyl methacrylate, lauryl methacrylate, stearyl methacrylate, stearyl polyethylene glycol methacrylate, isotridecyl methacrylate, ureidomethacrylate, tetrahydrofurfuryl methacrylate, phenoxyethyl methacrylate, 3,3,5-trimethylcyclohexanol methacrylate, isobornyl methacrylate, methoxy polyethylene glycol methacrylate, glycedyl methacrylate, hexylethyl methacrylate, glycerol formal methacrylate, lauryltetradecyl methacrylate, C17,4 methacrylate.

A polyfunctional biomonomer may be used in the form of a biobased acrylate. This may be selected from hexane-1,6-diol diacrylate, polyethylene glycol diacrylate, tetraethylene glycol diacrylate, tripropylene glycol diacrylate, polybutadiene diacrylate, 3-methylpentane-1,5-diol diacrylate, ethoxylated bisphenol A diacrylate, dipropylene glycol diacrylate, ethoxylated hexanediol diacrylate, decane-1,10-diol diacrylate, ester diol diacrylate, alkoxylated diacrylate, tricyclodecanedimethanol diacrylate, propoxylated neopentyl glycol diacrylate, pentaerythritol tetraacrylate, trimethylolpropane triacrylate, ditrimethylolpropane tetraacrylate, tris (2-hydroxyethyl) isocyanurate triacrylate, dipentaerythritol pentaacrylate, ethoxylated trimethylolpropane triacrylate, pentaerythritol triacrylate, propoxylated trimethylolpropane triacrylate, ethoxylated pentaerythritol tetraacrylate, propoxylated glyceryl triacrylate, aliphatic urethane diacrylate, aliphatic urethane hexaacrylate, aliphatic urethane triacrylate, aromatic urethane diacrylate, aromatic urethane triacrylate, aromatic urethane hexaacrylate, polyester hexaacrylate, epoxidized soya oil diacrylate.

In addition, it is possible to use a polyfunctional biomonomer in the form of a biobased methacrylate. This may be selected from triethylene glycol dimethacrylate, ethylene glycol dimethacrylate, polyethylene glycol dimethacrylate, butane-1,4-diol dimethacrylate, diethylene glycol dimethacrylate, hexane-1,6-diol dimethacrylate, decane-1,10-diol dimethacrylate, 1,3-butylene glycol dimethacrylate, ethoxylated bisphenol A dimethacrylate, tricyclodecanedimethanol dimethacrylate, trimethylolpropane trimethacrylate.

According to the invention, the weight ratio of mono- or polyfunctional acrylates and methacrylates to the polymer(s) or copolymer(s), especially selected from polyacrylates, polymethacrylates, polyols or polyesters, is 90:10 to 60:40, preferably 85:15 to 70:30.

The inorganic filler particles are also of natural, i.e. biological, origin and not from synthetic production. They may be selected from SiO2, Al2O3, TiO2, ZrO2, Fe2O3, ZnO, Cr2O5, carbon, metals or metal alloys, although it is also possible to use mixtures of two or more different types of filler particles. The mixing ratio may be as desired.

The inorganic filler particles here should have a particle size of 0.010 to 8000 μm, preferably 0.05 to 3000 μm, and especially 0.1 to 1300 μm. In addition, the inorganic filler particles should have a side ratio of 1.0 to 1000 (length: width of the individual particles).

Inorganic fillers in the form of SiO2 may be used in the form of quartz particles, cristobalite particles, pyrogenic silica particles, fumed silica particles, silica fibers, silica fibrils, silica particles, such as sheet silicates; Al2O3 particles, TiO2 particles, Fe2O3 particles, ZnO particles, Cr2O5 particles, soot particles, carbon nanotube particles, graphite particles or graphene particles.

As already described, it has been found that the moldings obtained, in spite of use of biobased starting materials of which the casting compound consists, have very good properties, especially mechanical properties. The polymerized bio-composite material of the molding should have an impact resistance of 2 to 5 mJ/mm$^2$, and should also have a thermal stability of −30 to 300° C.

In principle, irrespective of which casting compound is used or the composite material of which the casting consists, the proportion by mass of the filler particles based on the mass of the casting should be between 40-85%, especially between 60-80% and preferably between 65-75%.

In that the binder that forms the matrix of the composite material, no additional fillers are provided aside from the particulate fillers as described above. This is not required in any case since the composite material already has adequate, excellent mechanical properties. Nevertheless, however, it is conceivable to additionally introduce randomly distributed fibers, preferably polyamide fibers, in which case the fibers may have a length of 5-20 mm and a diameter of 0.05-0.2 mm, and a fiber content of 0.02-0.5 wt %, based on the total mass of the casting, may be provided. This means that short fibers may also be added in addition to the fillers, which have an additional positive effect on the mechanical properties. Preference is given to using PA fibers, preferably PA6 or PA6.6.

The fibers are short fibers, with a length of 5-15 and preferably of 8-12 mm, especially of 10 mm, having been found to be appropriate, in the case of a preferred diameter of 0.075-0.175 mm, especially 0.1-0.15 mm.

The proportion of fibers should appropriately be 0.025-0.25% by weight, preferably 0.03-0.2% by weight and especially 0.05-0.15% by weight, based on the total mass of the casting.

The fibers are more preferably aligned essentially with excellent alignment, preferably parallel to the outside or visible side of the casting. This means that, although the fibers are randomly distributed, they are nevertheless aligned primarily unidirectionally.

It is particularly advantageous when the fibers are introduced in such a way that there is a fiber-free margin adjoining the respective outer face or visible face in the entirety of the basin region, in the rim and on the skirt, such that no fibers at all are visible from the outer face or viewing face. The fibers are instead arranged toward the invisible inside or underside of the sink.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
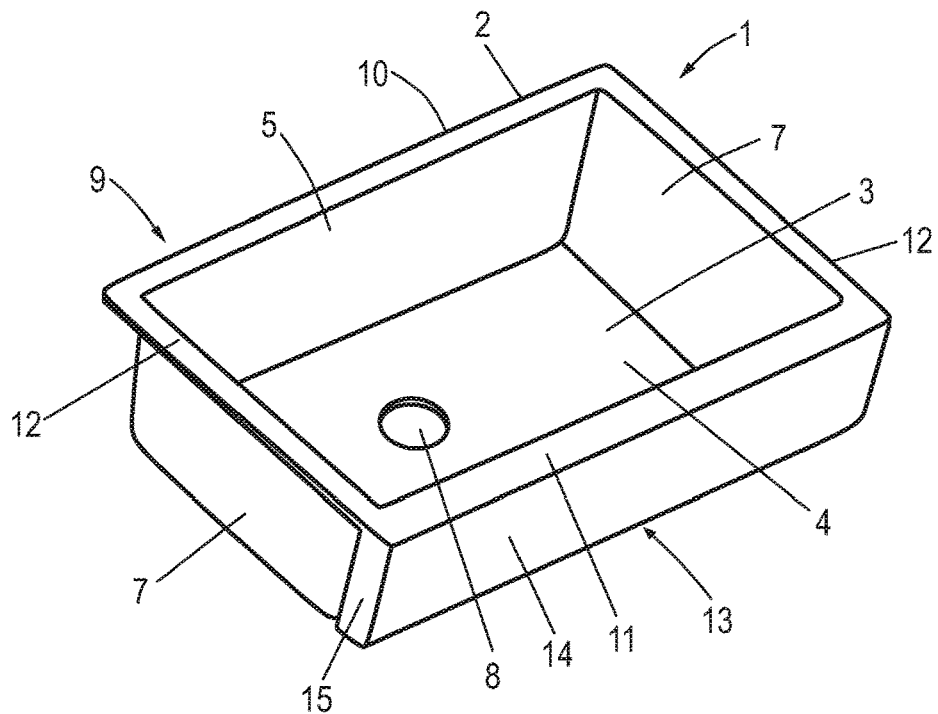
FIG. 1 a perspective view of a sink of the invention,
FIG. 2 a perspective view of the sink from FIG. 1 from beneath,
FIG. 3 a top view of the sink from FIG. 1,
FIG. 4 a sectional view along the IV-IV line and FIG. 3,
FIG. 5 a front side view along the V-V line from FIG. 3, and
FIG. 6 a perspective view of an installation example of the sink of the invention from FIG. 1 on a platform cabinet.
Figure 2:
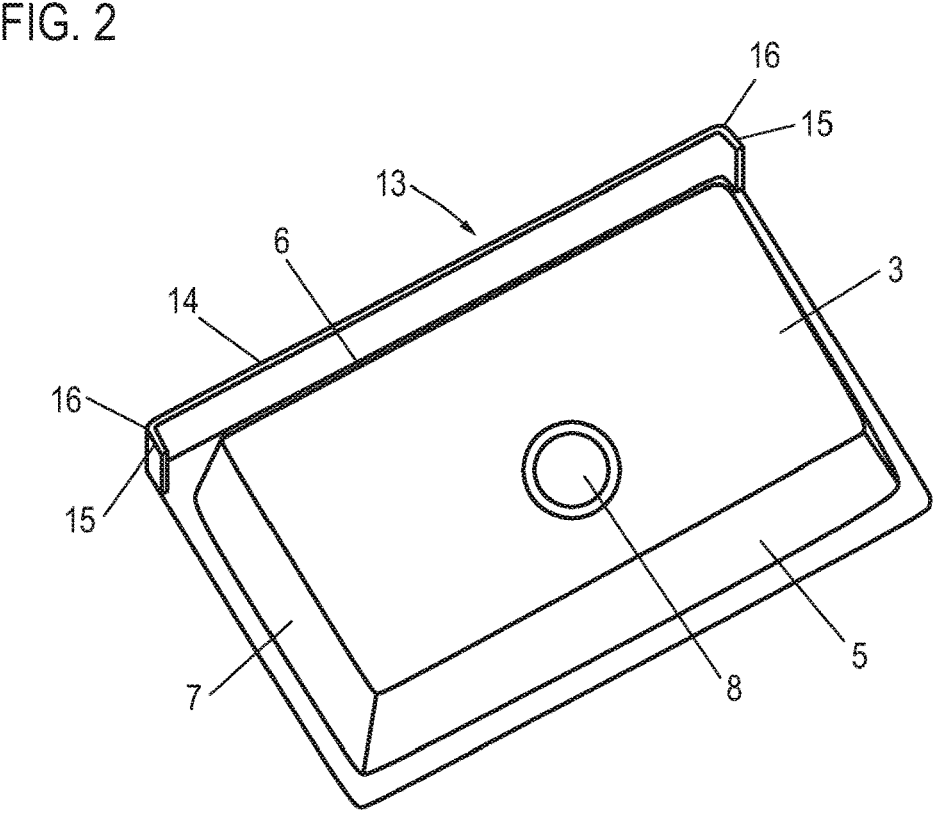

FIGS. 1 and 2 show an inventive casting 1 in the form of a sink 2 comprising a basin 3 having a base 4, a rear wall 5, a front wall 6 and two interconnecting side walls 7, wherein the base 4, in a manner known per se, an outlet 8 is formed.

Also provided is a circumferential rim 9 consisting of four flat rim sections 10, 11, 12 which extend from the lateral edges of the rear wall 5, of the front wall 6 and of the two side walls 7, and which run horizontally in the installed position with their outer faces visible in the installed position.

Additionally provided is a skirt 13 which is shaped onto the rim section 11 of the front wall 6 and which surpasses it in terms of height at least in sections, and indeed completely to some degree, as shown by FIGS. 1 and 2, but is also apparent from the other figures.

The skirt 13 consists of a middle skirt section 14 that extends over the entire length of the front wall 6 or of the rim section 11. This middle skirt section 14 merges into two lateral skirt sections 15 in a rounded manner, where these lateral skirt sections 15 are also shaped integrally onto the adjacent rim sections 12 of the side walls 7. The specific geometry is described in detail hereinafter with reference to FIGS. 3-5.

The sink 2 is a casting made of a composite material, comprising a cured polymeric binder that forms the actual matrix, and comprising filler particles intercalated in the matrix. The binder typically comprises at least one monomer and at least one polymer, and different binder compositions are conceivable. Reference is made to the above remarks relating to usable binders or binder compositions.

As well as various binder batches, it is also possible to use different filler particles that determine the mechanical, physical and visual properties of the sink. These may be selected from $SiO_2$, $Al_2O_3$, $TiO_2$, $ZrO_2$, $Fe_2O_3$, ZnO, $Cr_2O_5$, SiC, $CaCO_3$, quartz sand, quartz flour, carbon, metals or metal alloys, and have particle sizes in the range between 0.01-8000 µm, preferably in the range of 0.1-1300 µm. The proportion by mass of the filler particles should be between 40-85%, especially between 65-75%, based on the mass of the casting. In this regard too, reference is made to the above remarks relating to usable filler particles.

This means that different batches or mixtures exist in relation to the casting and the composite material respectively.

Figure 3:
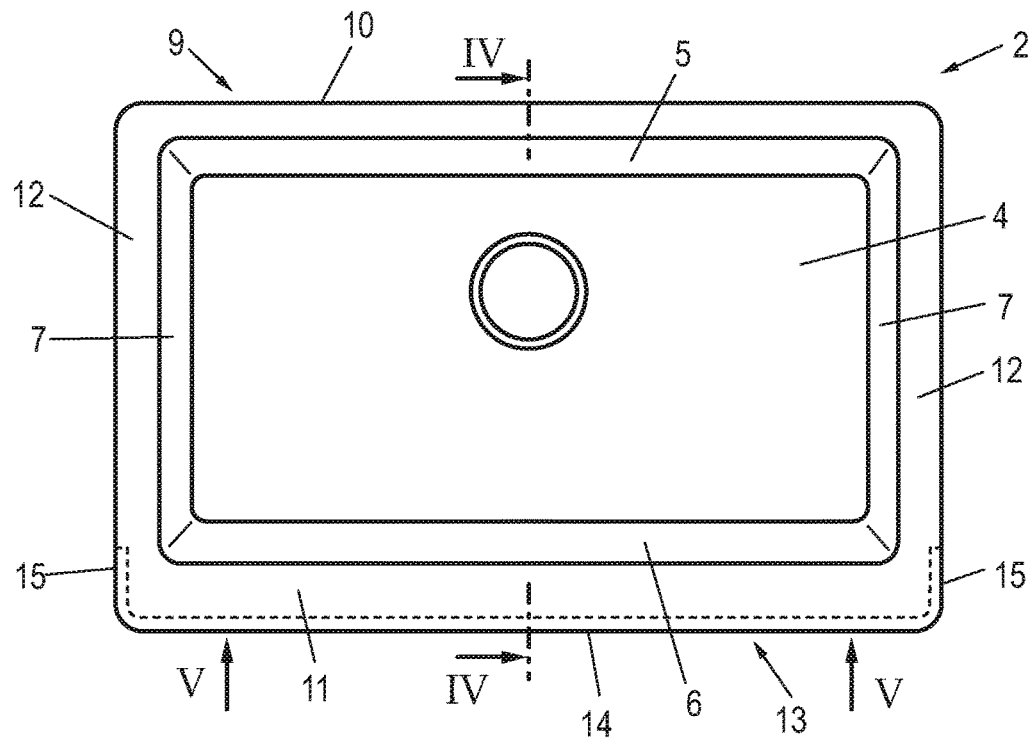
Figure 4:
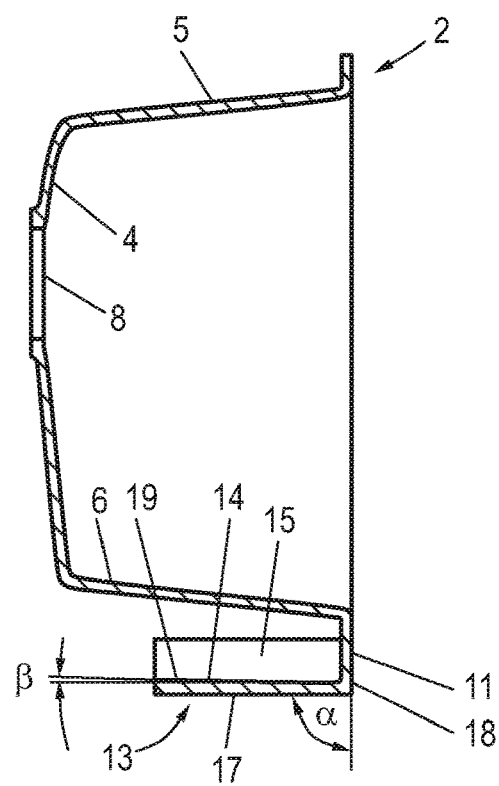
Figure 5:
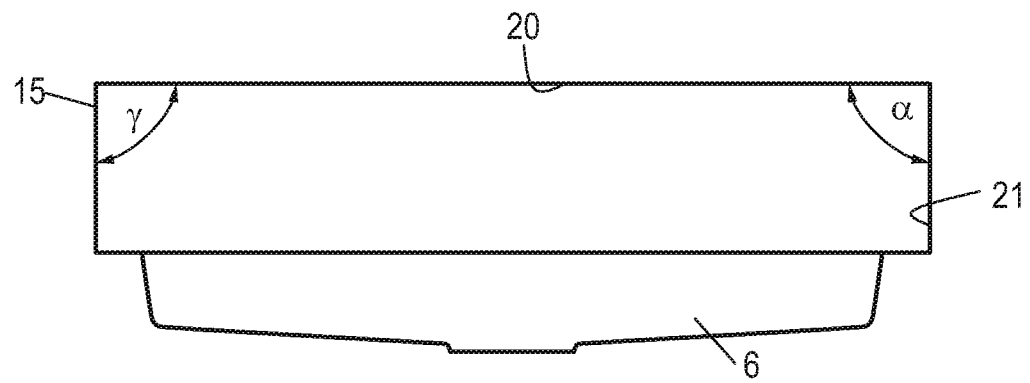

FIGS. 3-5 show the casting 1 and the sink 2 in various views.

FIG. 3 shows a top view of the sink 2, looking onto the base 4, also showing the walls drawn slightly inward, namely the rear wall 5, the front wall 6 and the side walls 7. Likewise shown is the rim 9 with its different rim sections 10, 11 and 12. The front rim section 11 in the example shown is somewhat broader than the other rim sections 10, 12 after the skirt 13 has been shaped thereon, extending vertically downward. Nevertheless, the width of the rim, in spite of the skirt shaped on, may also be the same around the circumference. As described, this firstly comprises the middle skirt section 14, and secondly the two lateral skirt sections 15. As already apparent in FIG. 2, these merge via a rounding 16 into the middle skirt section 14, meaning that the edge is rounded, such that it is not possible to collide therewith. The radius of this rounding 16 is in the range between 0.5-2 cm.

FIG. 4 shows a section view through the sink 2, from which the geometric ratios in the region of the skirt 13 in particular are visible.

As shown by FIG. 4 and especially also FIG. 5, the skirt 13 does not extend over the entire height of the front wall 6, but in the example shown extends only over about ⅔ of the height, where the height of the overhang depends ultimately on the specific case of installation, namely the situation relating to the connection of the skirt 13 to a platform cabinet or the like.

The skirt 13, or the middle skirt section 14 and the lateral skirt sections 15, had an outer face 17 visible in the installed position, which is at an angle of 90° relative to the visible outer face 18 of the rim section 11, where this angle α is shown in FIG. 4. This means that the two outer faces 17, 18 are at right angles to one another. As stated, this applies both with regard to the middle skirt section 14 and to the two lateral skirt sections 15.

The skirt 13 or the skirt sections 14, 15 narrow in thickness from the upper end by which they are attached to the rim section 11 or rim sections 12 toward their lower free end. The angle β by which the thickness of the middle skirt section 14 decreases is likewise shown in FIG. 4. The angle γ by which the thickness of the two lateral skirt sections 15 decreases is shown in FIG. 5. This means that the inner face 19, 21 of the skirt 13 or of the respective skirt section 14, 15 that is not visible in the installed position does not run parallel to the visible outer face 17, but runs at an angle.

This angle β, γ is fundamentally between 0.1-1.5°. In the middle skirt region 14, the angle β is preferably between 0.5°-1.5°, preferably between 0.7°-1.3° and especially about 1.0°. In the two lateral skirt sections 15, this angle γ is between 0.1°-1.0°, preferably between 0.2°-0.5° and especially about 0.2°. This angle γ that exists in the lateral skirt sections 15 and is shown in FIG. 5 defines the angle of the underside 20 of the rim section 11 which is invisible in the installed position with respect to the invisible inner face 21 of the two lateral skirt sections 15, and is 90.2° in the case of a narrowing angle of 0.2°.

This slight narrowing of the skirt 13 is appropriate for easier demolding, i.e. when the sink 2 is removed from the casting mold after the casting compound has cured.

As shown by FIG. 4, the lateral skirt sections 15 are relatively short when viewed horizontally, meaning that they do not extend as far as the front wall of the basin 3.

Figure 6:
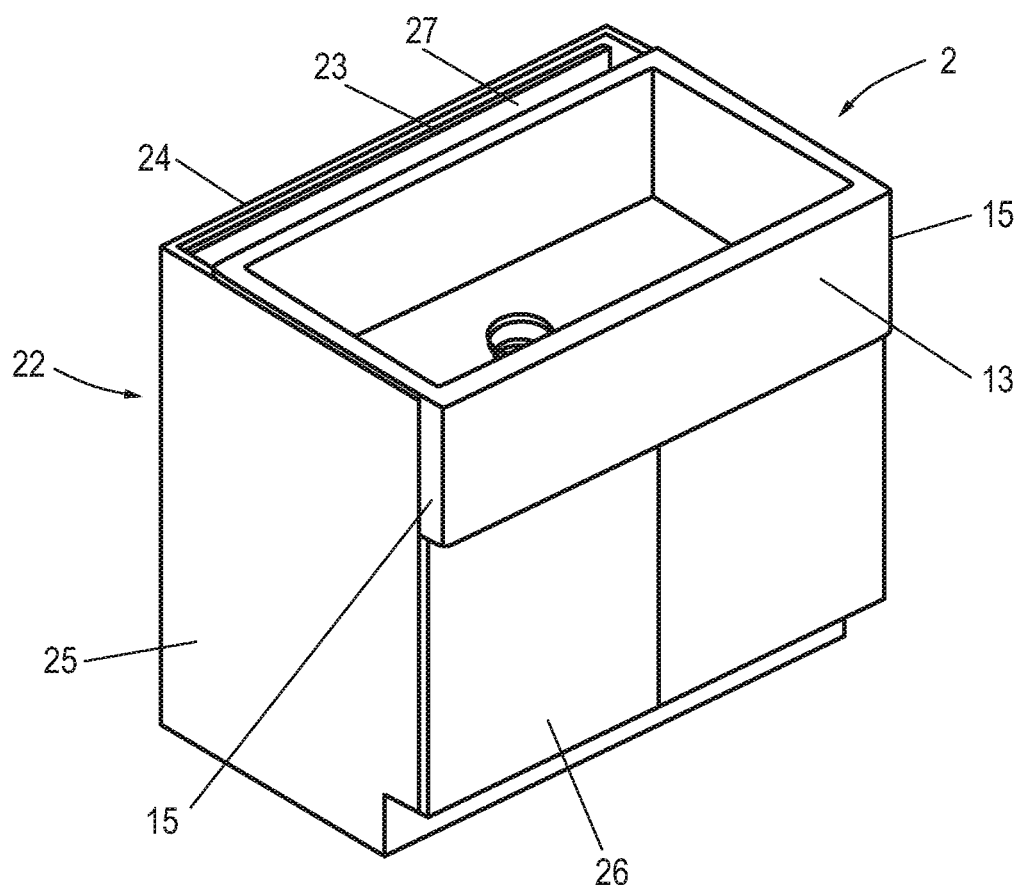

FIG. 6 shows an installation example of a sink 2 of the invention, here atop a platform cabinet 22, comprising a cabinet body 23 with a rear wall 24, two side walls 25 and one front wall 26, formed, for example, by means of two pivot-mounted doors or the like. A recess 27 is clearly apparent, into which the sink 2 is inserted. The skirt 13 serves as a screen from the front side, ending immediately above the front wall 26 of the platform cabinet 22. By contrast, the two lateral skirt sections 15 adjoin the corresponding front edge of the respective lateral wall 25 flush by their two vertical longitudinal edges, i.e. form a lateral connection of the skirt 13 to the platform cabinet 22 and face an otherwise visible gap between the middle skirt section 14 and the side walls 25. The result is an attractive fitting, with facing by means of the skirt 13.

In the course of installation, or even ex works, the top edges of the two side walls 25 of the platform cabinet 22, i.e. of the cabinet beneath, are machined about 8 mm deeper in the region on which the sink 2 rests, in accordance with the wall thickness of the lateral rim sections 12 of the rim of the sink 2 that rest thereon. The sink 2 is inserted by its lateral rims into this machined depression. The skirt 13 is not attached here.

Finally, the worktop (not shown here) is placed on top, and then lies flush on the edges of the sink 2, after which the sink 2 can be secured to the worktop by means of suitable securing means such as undermount clips.

While specific embodiments of the invention have been shown and described in detail to illustrate the inventive principles, it will be understood that the invention may be embodied otherwise without departing from such principles.

I claim:

1. A casting in the form of a sink, comprising a basin having a base, a rear wall, a front wall and two interconnecting side walls, and also a circumferential rim that extends to the side of the basin and consists of flat rim sections that extend in a straight line from the lateral edges of the rear wall, the side walls and the front wall, wherein the sink consists of a composite material comprising a cured polymeric binder and filler particles intercalated therein, wherein a skirt that surpasses the height of the front wall at least in sections adjoins at least the rim section of the front wall, wherein the skirt has an outer face that extends at right angles from the outer face of the rim section of the front wall and in a straight line up to the end of the skirt, wherein the skirt has an inner face that runs at an angle to the outer face so that the skirt narrows in thickness towards its end, wherein the skirt narrows in thickness from top to bottom over its entire height, wherein the skirt consists of a middle skirt section that extends along the front wall and two lateral skirt sections that merge into the rim sections of the side walls in a rounded manner, adjoin the lateral edges thereof and are at right angles to these rim sections, wherein the middle skirt section narrows more than the two lateral skirt sections, wherein the middle skirt section narrows at an angle between 0.5°-1.5°, and wherein the lateral skirt sections narrow at an angle between 0.1°-1.0°.

2. The casting according to claim 1, wherein the horizontal length of the lateral skirt sections is such that they end before the front wall.

3. The casting according to claim 1, wherein the thickness of the skirt narrows constantly at an angle between 0.1°-1.5°.

4. The casting according to claim 1, wherein the binder comprises a polymer.

5. The casting according to claim 4, wherein the polymer is polymethylmethacrylate.

6. The casting according to claim 1, wherein the binder comprises a crosslinker.

7. The casting according to claim 1, wherein it at least is composed of:
   (a) the polymeric binder produced from one or more mono- and one or more polyfunctional acrylic and/or methacrylic biomonomers of vegetable or animal origin,
   (b) one or more polymers or copolymers selected from polyacrylates, polymethacrylates, polyols, polyesters made from recycled material or of vegetable or animal origin,
   (c) inorganic filler particles of natural origin, wherein the proportion of the mono- and polyfunctional acrylic and methacrylic biomonomer(s) is 10-40% by weight, the proportion of the polymer(s) or copolymer(s) is 1-16% by weight and the proportion of inorganic filler particles is 44-89% by weight.

8. The casting according to claim 7, wherein the weight ratio of monofunctional biomonomers to polyfunctional biomonomers is 2:1 to 80:1.

9. The casting according to claim 7, wherein monofunctional biomonomers(s) is/are selected from a group of biobased acrylates consisting of n-butyl acrylate, methyl acrylate, ethyl acrylate, tert-butyl acrylate, isobutyl acrylate, isodecyl acrylate, dihydrodicyclopentadienyl acrylate, ethyldiglycol acrylate, heptadecyl acrylate, 4-hydroxybutyl acrylate, 2-hydroxyethyl acrylate, hydroxyethylcaprolactone acrylate, polycaprolactone acrylate, hydroxypropyl acrylate, lauryl acrylate, stearyl acrylate, tertiobutyl acrylate, 2-(2-ethoxy)ethyl acrylate, tetrahydrofurfuryl acrylate, 2-phenoxyethyl acrylate, ethoxylated 4-phenyl acrylate, trimethylcyclohexyl acrylate, octyldecyl acrylate, tridecyl acrylate, ethoxylated 4-nonylphenolacrylate, isobornyl acrylate, cyclic trimethylolpropane formal acrylate, ethoxylated 4-lauryl acrylate, polyester acrylate, stearyl acrylate, hyperbranched polyester acrylate, melamine acrylate, silicone acrylate, epoxy acrylate, and from a group of biobased methacrylates consisting of methyl methacrylate, ethyl methacrylate, n-butyl methacrylate, isobutyl methacrylate, tert-butyl methacrylate, behenyl methacrylate, ehenyl polyethylene glycol methacrylate, cyclohexyl methacrylate, isodecyl methacrylate, 2-ethylhexyl methacrylate, lauryl methacrylate, stearyl methacrylate, stearyl polyethylene glycol methacrylate, isotridecyl methacrylate, ureido methacrylate, tetrahydrofurfuryl methacrylate, phenoxyethyl methacrylate, 3,3,5-trimethylcyclohexanol methacrylate, isobornyl methacrylate, methoxy polyethylene glycol methacrylate, glycedyl methacrylate, hexylethyl methacrylate, glycerol formal methacrylate, lauryltetradecyl methacrylate, C17,4 methacrylate.

10. The casting according to claim 7, wherein the polyfunctional biomonomer(s) is/are selected from a group of biobased acrylates consisting of hexanediol 1,6-diacrylate, polyethylene glycol diacrylate, tetraethylene glycol diacrylate, tripropylene glycol diacrylate, polybutadiene diacrylate, 3-methylpentane-1,5-diol diacrylate, ethoxylated bisphenol A diacrylate, dipropylene glycol diacrylate, ethoxylated hexanediol diacrylate, decane-1,10-diol diacrylate, esterdiol diacrylate, alkoxylated diacrylate, tricyclodecanedimethanol diacrylate, propoxylated neopentyl glycol diacrylate, pentaerythritol tetraacrylate, trimethylolpropane triacrylate, ditrimethylolpropane tetraacrylate, tris(2-hydroxyethyl)isocyanurate triacrylate, dipentaerythritol pentaacrylate, ethoxylated trimethylolpropane triacrylate, pentaerythritol triacrylate, propoxylated trimethylolpropane triacrylate, ethoxylated pentaerythritol tetraacrylate, propoxylated glyceryl triacrylate, aliphatic urethane diacrylate, aliphatic urethane hexaacrylate, aliphatic urethane triacrylate, aromatic urethane diacrylate, aromatic urethane triacrylate, aromatic urethane hexaacrylate, polyester hexaacrylate, epoxidized soya oil diacrylate, and from a group of biobased polyfunctional methacrylates consisting of triethylene glycol dimethacrylate, ethylene glycol dimethacrylate, polyethylene glycol dimethacrylate, butane-1,4-diol dimethacrylate, diethylene glycol dimethacrylate, hexane-1,6-diol dimethacrylate, decane-1,10-diol dimethacrylate, 1,3-butylene glycol dimethacrylate, ethoxylated bisphenol A dimethacrylate, tricyclodecanedimethanol dimethacrylate, trimethylolpropane trimethacrylate.

11. The casting according to claim 7, wherein the weight ratio of mono- and polyfunctional acrylate and methacrylates to the polymer(s) or copolymer(s) is 90:10 to 60:40.

12. The casting according to claim 1, wherein the inorganic filler particles are selected from $SiO_2$, $Al_2O_3$, $TiO_2$, $ZrO_2$, $Fe_2O_3$, ZnO, $Cr_2O_5$, SiC, $CaCO_3$, quartz sand, quartz flour, carbon, metals or metal alloys.

13. The casting according to claim 1, wherein the inorganic filler particles have a particle size of 0.010 to 8000 μm.

14. The casting according to claim 1, wherein the inorganic filler particles have a side ratio of length to width where the ratio varies from 1.0 to 1000 (length:width of the individual particles).

15. The casting according to claim 1, wherein the proportion by mass of the filler particles based on the mass of the casting is between 40-85%.

16. The casting according to claim 1, wherein the middle skirt region narrows at an angle between 0.7°-1.3°.

17. The casting according to claim 16, wherein the middle skirt region narrows at an angle of 1.0°.

18. The casting according to claim 1, wherein the lateral skirt sections narrow at an angle between 0.2°-0.5°.

19. The casting according to claim 18, wherein the lateral skirt sections narrow at an angle of 0.2°.

20. The casting according to claim 6, wherein the crosslinker is trimethylolpropane trimethacrylate.

21. The casting according to claim 8, wherein the weight ratio of monofunctional biomonomers to polyfunctional biomonomers is 4:1 to 70:1.

22. The casting according to claim 21, wherein the weight ratio of monofunctional biomonomers to polyfunctional biomonomers is 5:1 to 60:1.

23. The casting according to claim 11, wherein the weight ratio of mono-and polyfunctional acrylate and methacrylates to the polymer(s) or copolymer(s) is 85:15 to 70:30.

24. The casting according to claim 13, wherein the inorganic filler particles have a particle size of 0.05 to 3000 μm.

25. The casting according to claim 24, wherein the inorganic filler particles have a particle size of 0.1 to 1300 μm.

26. The casting according to claim 15, wherein the proportion by mass of the filler particles based on the mass of the casting is between 60-80%.

27. The casting according to claim 26, wherein the proportion by mass of the filler particles based on the mass of the casting is between 65-75%.

* * * * *